(12) United States Patent
Subramanian et al.

(10) Patent No.: US 6,248,699 B1
(45) Date of Patent: Jun. 19, 2001

(54) GELLING SYSTEM FOR HYDROCARBON FLUIDS

(75) Inventors: Shankar Subramanian, Dublin; Yun-peng Zhu, Columbus, both of OH (US); Charles R. Bunting, Country Club Hills; RoseMarie E. Stewart, Chicago, both of IL (US)

(73) Assignee: Crompton Corporation, Greenwich, CT (US)

( * ) Notice: Subject to any disclaimer, the term of this patent is extended or adjusted under 35 U.S.C. 154(b) by 0 days.

(21) Appl. No.: 09/363,489

(22) Filed: Jul. 29, 1999

(51) Int. Cl.$^7$ .................................................. C09K 3/00
(52) U.S. Cl. ..................... 507/265; 507/267; 507/922; 585/3; 516/29; 166/308
(58) Field of Search ........................ 507/265, 267, 507/922; 585/3; 516/29; 166/308

(56) References Cited

U.S. PATENT DOCUMENTS

| | | | |
|---|---|---|---|
| 2,356,254 | * 8/1944 | Lehmann, Jr. | 507/265 |
| 2,596,843 | 5/1952 | Farris | 166/21 |
| 2,596,844 | 5/1952 | Clark | 166/21 |
| 2,626,897 | 1/1953 | Young | 252/35 |
| 2,724,439 | 11/1955 | Brainerd | 166/22 |
| 2,737,494 | 3/1956 | Frank | 252/39 |
| 2,751,283 | 6/1956 | Strien et al. | 44/7 |
| 2,751,359 | 6/1956 | Hill et al. | 252/316 |
| 2,751,361 | 6/1956 | Van Strien et al. | 252/316 |
| 2,763,621 | 9/1956 | Shulman | 252/316 |
| 2,802,850 | 8/1957 | Wetzel | 260/448.2 |
| 2,866,754 | * 12/1958 | Cardwell et al. | 252/8.55 |
| 2,869,643 | 1/1959 | Schuessler et al. | 166/42 |
| 2,898,294 | 8/1959 | Priest et al. | 252/8.55 |
| 2,946,748 | * 7/1960 | Steiner | 507/265 |
| 2,952,695 | 9/1960 | Stedehouder et al. | 260/414 |
| 3,065,171 | * 11/1962 | Morrow et al. | 507/265 |
| 3,163,604 | * 12/1964 | Dubin | 507/265 |
| 3,179,172 | * 4/1965 | Reed et al. | 507/265 |
| 3,376,327 | * 4/1968 | Freeland | 507/265 |
| 3,406,115 | 10/1968 | White | 252/8.5 |
| 3,791,972 | * 2/1974 | Myers | 585/3 |
| 3,799,267 | * 3/1974 | Ely et al. | 507/265 |
| 3,846,310 | * 11/1974 | Blackwell et al. | 507/265 |
| 3,900,070 | * 8/1975 | Chatterji | 507/265 |
| 4,069,236 | 1/1978 | Hutchison et al. | 260/414 |
| 4,104,173 | 8/1978 | Gay et al. | 252/8.55 R |
| 4,316,810 | 2/1982 | Burnham | 252/8.55 R |
| 4,622,155 | 11/1986 | Harris et al. | 252/8.551 |
| 4,981,608 | * 1/1991 | Gunther | 507/265 |
| 5,082,059 | 1/1992 | Engelhardt et al. | 166/308 |
| 5,258,137 | 11/1993 | Bonekamp et al. | 252/356 |
| 5,417,287 | * 5/1995 | Smith et al. | 507/922 |
| 5,614,010 | 3/1997 | Smith et al. | 106/285 |

FOREIGN PATENT DOCUMENTS

| | | |
|---|---|---|
| 0 207 787 B1 | 1/1987 | (EP) . |
| 0 225 661 B1 | 6/1987 | (EP) . |
| 0 835 983 A2 | 4/1998 | (EP) . |
| 0 835 983 A3 | 4/1998 | (EP) . |
| 2 191 716 | 12/1987 | (GB) . |
| 10-102033 | * 4/1988 | (JP) . |

OTHER PUBLICATIONS

Maberry, L. J. et al., "New Complexation Chemistry Provides Improved Continuous–Mix Gelled Oil", *Society of Petroleum Engineers*, 169–174 (1997).

McCabe, M.A. et al., "Continuously Gelled Diesel Systems for Fracturing Applications", Petroleum Society of CIM/Society of Petroleum Engineers, 93-1-93-11 (1990).

Subramanian, Shankar, "Preparation of 2–Ethylhexanoic acid, Aluminum Salt", *Teltech Literature Search Service*, 1–7 (Oct. 19, 1998).

Cramer et al., "An Improved Gelled Oil System for High–Temperature Fracturing Applications", *Society of Petroleum Engineers*, SPE 21859, pp. 545–562., (1991).

de Vries et al., "Small Depsipeptides as Sovent Gelators", *J. Chem Soc. Shem. Commun.*, pp238–240 (1993).

Fukasawa, J–I and Tsutsumi, H., *J.Colloid Interface*, Sci, 1991, 143(1), 69.

Terech et al., "Living Polymers in Organic Solvents", *Languir*, 8;2104–2106 (1992).

Terech, "Low–molecular weight organogelators", pp 208–263, No Date Available.

* cited by examiner

*Primary Examiner*—Philip Tucker
(74) *Attorney, Agent, or Firm*—Shirley S. Ma

(57) ABSTRACT

The present invention relates to a gelled hydrocarbon fluid useful as a fracturing fluid in subterranean formations comprising at least one gelling agent which is a salt of a carboxylic acid having from about 6 to about 30 carbon atoms. An activator which is a difunctional and/or trifunctional carboxylic acid is preferably added to control gel time.

26 Claims, No Drawings

GELLING SYSTEM FOR HYDROCARBON FLUIDS

FIELD OF THE INVENTION

The present invention relates to improved hydrocarbon gels useful in oil field applications including slurry pipeline transport of minerals, removal of solids produced during wellbore drilling operations, and for fracturing fluids and proppant transport. The present invention also relates to a method of using the hydrocarbon gels of the present invention as fracturing fluids.

In particular, the present invention relates to the use of salts Of $C_6$ to $C_{30}$ carboxylic acids, such as salts of 2-ethyl hexanoic acid, or polymeric fatty acid salts such as poly-oxo-metallic salts of fatty acids, as gelling agents for hydrocarbon liquids. Preferably, these salts of acids are utilized in combination with a gel activator which is a difunctional and/or trifunctional carboxylic acid, as a gelling system for hydrocarbon liquids.

BACKGROUND OF THE INVENTION

Gelled hydrocarbons have been used in petroleum producing subterranean formations as fracturing fluids to improve the recovery of oil and natural gas. The fracturing fluids are hydraulically injected into a wellbore which penetrates the subterranean formation, and are propelled against the formation strata by high pressure, forcing the strata to crack and fracture.

The fracturing fluids carry proppant particles to the fracture site. These proppant particles remain in the fracture thereby "propping" the fracture open when the well is in production. The proppant material is commonly sand, sintered bauxite, polystyrene beads, and so forth, and is generally suspended in the gelled fluid due to the insolubility of the particles in the fluid.

Fracturing fluids may be thickened or gelled through the use of various chemical agents which act to increase viscosity or induce the gel formation. It is in fact widely accepted that the viscosity of liquid hydrocarbon fracturing fluids can be increased by a variety of thickening agents including fatty esters, orthophosphate esters, and aluminum complexed fatty acids.

Fatty ester gelling systems are for the most part, no longer utilized in oil field operations. The problem which was associated with these systems was the failure to generate adequate viscosity within the required time, i.e. the time required to pump the gel to the fracture site, therefore requiring aging of the gel prior to use.

A second class of gelling agents are the phosphate based compounds, including alkyl phophates coupled with aluminum and iron such as aluminum salts of orthophosphate esters. Aluminum crosslinked or iron crosslinked orthophosphate esters are probably the most commonly used gelling agents available today. They may be utilized in either a batch-mix or a continuous-mix process, and gel times can be quite fast. Most service companies do utilize a continuous mix process for the phosphate ester systems. However, there is an increasing demand in the oil industry for non-phosphate based gelling agents because phophates are known to be detrimental to the refining process.

Problems exist with the currently available systems as well. U.S. Pat. No. 5,614,010 issued Mar. 25, 1997 to Smith et al. describes problems associated with the use of aluminum compounds. Smith et al. state that aluminum will not satisfactorily perform the desired crosslinking function in the presence of more than about 1200 ppm of water, nor where the pH is outside a relatively narrow range. Smith et al. overcame this problem by utilizing ferric salts, rather than aluminum compounds for combination with orthophosphate ester.

The aluminum complexed fatty acids include aluminum octoates and aluminum stearates. A specific compound is the aluminum soap of 2-ethylhexoic acid, also referred to as aluminum octoate.

U.S. Pat. No. 5,417,287 describes iron crosslinked phosphate gels which exhibit fast gelling times.

U.S. Pat. No. 3,799,267 issued Mar. 26, 1974 to Ely et al. describes "a method whereby the viscosity of a liquid hydrocarbon, having an aluminum soap of an oil soluble aliphatic carboxylic acid solvated therein, is unexpectedly increased by dissolving benzoic acid in the hydrocarbon liquid." Ely et al. go on to state that "the addition of benzoic acid to a liquid hydrocarbon having an aluminum soap of an oil soluble aliphatic carboxylic acid solvated therein, has been found to further increase the viscosity of the liquid hydrocarbon by as much as 100 times the viscosity produced by an equivalent concentration of the aluminum soap solvated therein." See column 1, lines 39 to 50.

U.S. Pat. No. 4,981,608 issued Jan. 1, 1991 to Gunther describes the use of a gelling agent for a hydrophobic organic liquid comprising the solid reaction product of a poly-oxo-aluminum stearate and 2-ethyl hexanoic acid. Gunther states at column 2, lines 62 to 65 that "gelling occurs within a comparably very short time, such as one hour upon spraying or intermixing the gelling agent into the liquid to be gelled." Furthermore, many of the fatty acid systems are solids, while many end users prefer liquid based systems.

The present invention has overcome the aforementioned problems through the use of a hydrocarbon based gel which comprises at least one salt of a carboxylic acid having from about 6 to about 30 carbon atoms. Preferably, the salt is an aluminum tri-salt of 2-ethylhexanoic acid, and preferably at least one activator is utilized whereby the gelling can be controlled by the addition of the activator, and gelation can occur very quickly. The present invention utilizes a continuous mix gel process.

SUMMARY OF THE INVENTION

The present invention relates to a gelling system useful in hydrocarbon based fracturing fluids comprising at least one salt of a carboxylic acid having from about 6 to about 30 carbon atoms. Preferably, the salt is an aluminum tri-salt of 2-ethylhexanoic acid, and preferably at least one activator is utilized to control gelation to preferably less than about 5 minutes, and more preferably less than about 3 minutes. The rate of gellation will further depend on the hydrocarbon fluid to be gelled, the other ingredients added, and the combinations of the ingredients utilized, and the concentration of each component as well as on the activator. The activator is a difunctional and/or trifunctional acid, or a mixture thereof. Preferably, the activator is a dimer-trimer fatty acid, or a polymeric fatty acid. The salt may also be a metal alkoxide dicarboxylate salt.

The resultant hydrocarbon gels have thermal stability of greater than about 200° F. (about 93.3° C.) as exhibited by maintenance of a viscosity which is adequate for particle, i.e. proppant, suspension for instance The present invention further relates to a continuous mix gel method for preparing the hydrocarbon gels of the present invention.

The present invention further relates to a method of fracturing a subterranean formation comprising the steps of providing the hydrocarbon gel of the present invention through a wellbore to a subterranean formation at a pressure sufficient enough to fracture the formation.

DETAILED DESCRIPTIONS OF THE PREFERRED EMBODIMENTS

The gelling agents useful to the present invention are salts of carboxylic acids having from about 6 to about 30 carbon atoms, and preferably from about 8 to about 20 carbon atoms.

These gelling agents may be prepared by heating the carboxylic acid with a multivalent metal compound. These metals are preferably divalent or trivalent, and may be complexed with anions including halides, hydroxides, sulfates, sulfonates, nitrates, carboxylates, and other oxo anions, and so forth. Preferably, this is accomplished in a ratio of about two or three carboxylic acid equivalents to one metal, and preferably, the salts formed are di and tri-salts having the following general formula:

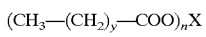

wherein y is 6 to 28, and preferably 6 to 18; n is 2 or 3; and X is a multivalent metal such as aluminum, boron, zinc, copper, iron, magnesium, calcium, barium, titanium, zirconium, tin, cobalt and so forth, and mixtures thereof, or a metal alkoxide, complexed to carboxylic acid groups. Aluminum is one of the preferred multivalent metals for use in the present invention. Most preferably, the resultant salts are tri-salts having three carboxylic acid groups complexed to one metal, or the structure is a metal covalently bonded to an alkoxide group and two carboxylic fatty acid groups.

Specific aluminum compounds useful herein include aluminum acetate, aluminum alkoxides including isopropoxide, aluminum sulfate, aluminum chloride, aluminum hydroxide and poly-oxo-aluminum compounds.

The carboxylic acids are preferably branched, and have from about 6 to about 30 carbon atoms. A preferable branched carboxylic acid for use herein is 2-ethylhexanoic acid. Linear carboxylic acids may also be utilized in combination with the branched carboxylic acids of the present invention, a preferable linear carboxylic acid being octanoic acid. The linear carboxylic acids do not appear to gel sufficiently, or to have a sufficient increase in viscosity, when utilized alone in hydrocarbon solvents.

The resultant gelling agents are either solid or liquid, but are preferably liquid. Solvent may be added if desirable.

A specific gelling agent may be formed by heating 2-ethylhexanoic acid with an aluminum compound. Preferably, this is accomplished using a ratio of about 3:1 of the 2-ethylhexanoic acid to the aluminum compound so that the following is formed:

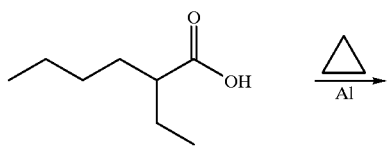

I

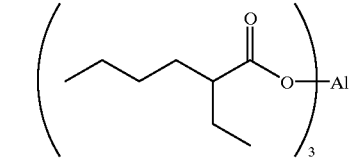

Examples of general structures of useful gelling agents include those having the following general structures:

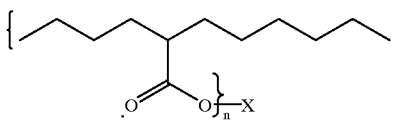

Guerbet Acid ($C_{12}$)

II

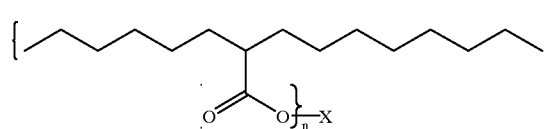

Guerbet Acid ($C_{16}$)

III

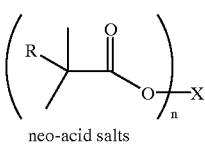

neo-acid salts

IV

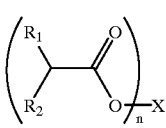

V

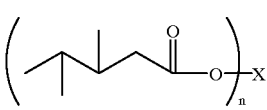

VI

In structures the structures II through VI, above, n may be 2 or 3. In structure V, $R_1$ is an organic group having from 1 to 9 carbon atoms and $R_2$ is an organic group having from 6 to 10 carbon atoms. In preferred embodiments of the present invention, X is aluminum, and n is 3.

Alternative structures for gelling agents useful to the present invention include the following general structure wherein X is a metal alkoxide, and is further bonded to two fatty carboxylic acid groups:

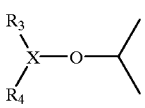

VII where $R_3$ and $R_4$ are fatty acids having from 6 to 30 carbon atoms. One specific structure is one in which both $R_3$ and $R_4$ are 2-ethylhexanoic acid, and X is aluminum isopropoxide.

Polymeric fatty acid salts are also useful providing they are utilized in combination with an activator, including poly-oxo-metallic salts of fatty acids such as poly-oxo-aluminum fatty acid salts.

Linear carboxylic acid salts may be utilized in combination with the branched carboxylic acid salts of the present invention. One example is a linear octoate salt which has the following general structure:

VIII

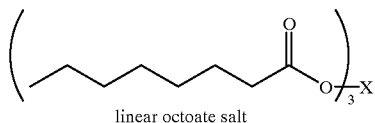
linear octoate salt

It is surmised that the tri-substituted central aluminum atoms and the three carboxylate groups attached thereto form cylindrical aggregates wherein doubly bonded oxygen atoms associate with aluminum atoms from adjacent molecules. These types of structures may be found in Fukasawa, J -I. and Tsutsumi, H., *J. Colloid Interface*, Sci., 1991, 143(1), 69.

The gelling agents may be added directly to the hydrocarbon liquid, or a mixture of hydrocarbon liquids. Hydrocarbon liquids used in the fracturing process may be, for instance, diesel fuel, crude oil, Fracsolve® fracturing fluid, toluene, xylene, hexane, or other hydrocarbon solvents, and so forth. The gelling agents are added to the hydrocarbon liquids in amounts of less than about 20%, preferably less than about 10% and most preferably less than about 5% by weight of the mixture.

The addition of an activator is critical for rapid gellation of less than about 10 minutes, preferably less than about 5 minutes, and more preferably less than about 3 minutes. In some preferred embodiments, the gellation occurs within about 30 seconds to about 3 minutes. The rate of gelation can be controlled with addition of the activator as required in oil field operations for either continuous or batch mix processing. If no activator is added, the time required for gelling will be more prolonged. The rate of gellation of course also depends on the hydrocarbon fluid, the other ingredients which are added, and the amount of each ingredient, as well. The rate will therefore vary, even if an activator is added, depending on all other factors.

Keeping all other things constant, the rate of gelation of a composition with an activator was faster than without an activator. Furthermore, some compositions which had no activator, formed poor gels, having low viscosities of less than about 100 cPs.

The activators include difunctional and trifunctional carboxylic acids, and mixtures thereof. Preferably, the acid has a mixture of difunctionality and trifunctionality. The ratio of difunctionality to trifunctionality it preferably about 1:1.

Useful activators include branched or linear dicarboxylic/tricarboxylic acids such as dimer-trimer fatty acids which are derived from monomeric unsaturated fatty (i.e. carboxylic) acids. Preferred monomeric unsaturated fatty acids typically have more than 18 carbon atoms. However, these monomeric unsaturated fatty acids can have as few as about 8 carbon atoms.

These dimer-trimer fatty acids are dibasic-tribasic carboxylic acids obtained by intermolecular addition reaction (dimerization or trimerization) between two or three molecules of an unsaturated fatty acid, and are usually obtained as a mixture of several kinds of different molecular species. For example, commercial products of dimeric/trimeric acids are each a mixture mainly consisting of one or more dibasic carboxylic acids having 36 carbon atoms in a molecule in admixture with tribasic carboxylic acids having 54 carbon atoms in a molecule as a secondary constituent.

There are many different dimer-trimer products having different ratios of monofunctional, difunctional, trifunctional and polyfunctional acids in the mix. Products having high amounts of dimer and trimer are preferred, it is surmised, because the reactivity is greater than with monofunctional acids. The dimer-trimer fatty acid has been found to be a preferred activator in the present invention.

Other acids which may also enhance the viscosity of the hydrocarbon fluid include aromatic dicarboxylic or tricarboxylic acids including isophthalic acid, terephthalic acid, naphthalene-dicarboxylic acid, tert-butylisophthalic acid, 1,1,3-trimethyl-3-phenylindan-4',5-dicarboxylic acid, tartaric acid, as well as other diacids not listed here, and so forth, may also be utilized to increase the rate at which the gel forms.

Other carboxylic acids may be utilized in combination with the di- or tri-functional carboxylic acids including hydroxy carboxylic acids such as hydroxybenzoic acid.

Any mixtures of such acids are contemplated for use herein. These acids, or activators are useful from about 0.01% to about 20%, preferably from about 0.02% to about 10%, and most preferably from about 0.05% to about 5% by weight of the mixture.

Water may also be added to the hydrocarbon liquid in amounts up to about 5%, preferably less than about 1%, and most preferably less than about 0.5% by weight of the mixture. In a preferred embodiment of the present invention, the water is added at a concentration of 0.1%.

Monomeric fatty acids having from about 8 to about 30 carbon atoms may also be added to the present invention to improve the rheological properties of the gel. These fatty acids are not to be confused with the dimer-trimer fatty acids used for activation of the gel, and include lauric ($C_{12}$), myristic ($C_{14}$), palmitic ($C_{16}$), oleic ($C_{18}$), stearic ($C_{18}$), and so forth, and mixtures thereof. Those which are saturated are preferred, but those having unsaturation such as oleic, are also useful herein. It is surmised that some unsaturation can lead to the formation of a weaker gel structure as measured by a Fann 50 Rheometer. This weaker structure makes the gel more susceptible to shear. This can be detrimental to fracturing fluids as such fluids are exposed to high shear. Naphthenic acid has also been found to be useful to improve the flow of the gel for pumping into the wellbore.

Optionally, other ingredients may be added to the hydrocarbon liquids of he present invention. These include foaming agents carbon dioxide, air, nitrogen, fluorocarbons, and so forth. Blowing agents which produce gases upon reaction or decomposition may also be employed to provide foamed compositions and include sodium carbonate, ammonium carbonate, zinc carbonate, sodium bicarbonate, magnesium bicarbonate, potassium bicarbonate, and so forth. The blowing agent is contacted with the fluid to be foamed, which is further contacted with an acid material such that carbon dioxide, for instance, is formed.

Foaming is typically accomplished in the presence of a surfactant which is capable of forming a foam. Fluorocarbon based surfactants find utility as foaming agents. For example, a surfactant having a fluorinated moiety, or some such similar moiety, is capable of forming a foam. Surfactants having inorganic counterions may also facilitate foaming.

Other conventional additives, e.g. breakers, used with hydrocarbon-based fracturing fluids can also be used in the fluids of the present invention. The viscosity of the gelled fluid may be decreased by the addition of a breaker once the operation in which the gel is being used has been completed. For instance, breakers are required to "break" the gel once the fracturing is complete and the proppant has been placed in the fracture site. This makes removal of the hydrocarbon fluid easier. It is desirable to be able to control the breaking of the gel so that the viscosity does not prematurely break prior to completion of the process.

The gelling system of the present invention forms thermally stable, highly viscous gels in a variety of hydrocarbon liquids, the gel having a thermal stability of greater than about 200° F. (about 93° C.), which can be utilized in oilfields for fracturing water sensitive subterranean formations, and for proppant transportation. The gels of the present invention find most use where the subterranean formations are water sensitive and will swell inordinately if water is introduced. The gels of the present invention form stable gels in environments where water is present in amounts of less than about 5% by weight of the gel.

The gels of the present invention may be prepared using a batch mix or a continuous mix gel system. In a continuous mix system, the gelling agent, prepared as above, may added to the hydrocarbon liquid and mixed until dispersed. The activator may then be immediately added for gellation control, followed by water which then results in the gel, as indicated by an increase in viscosity. Preferably, gellation with the addition of the activator will occur in less than about 5 minutes, and preferably from about 1.5 to about 3 minutes.

Alternatively, the activator may be mixed with the gellant, and then added to the hydrocarbon liquid in order to minimize the number of additives required which is preferable in oil field operations.

The order of addition of ingredients may be changed depending on the system used, to obtain optimum results.

The initial viscosity, absent the presence of an activator is less than about 100 cPs, while with an activator, the initial viscosity is greater than about 1,000 cPs as measured by a Fann 50 at ambient, i.e. room temperature, at about 3 minutes, and using a rate of about 100 sec$^{-1}$.

The gels of the present invention can be utilized for transportation of solid particulate matter produced during construction operations, or during well drilling operations. Such applications include transportation of cuttings, pipeline cleaning, diverting agents, lost circulation and so forth instance.

A primary application for such fluids is to carry proppant materials to a fracture site during well drilling operation wherein these proppants are used to keep the fracture open once the well goes into production. This improves the yield of oil or natural gas produced from the well. The proppant material is often sand, sintered bauxite, polystyrene beads, glass beads, and so forth.

These gels which carry the proppant material, also act as the fracturing fluid. During hydraulic fracturing, the fracturing fluid is injected through a wellbore under high pressure sufficient to initiate or extend fractures into the subterranean formation.

The gels of the present invention are also useful as diverting agents to prevent fluids from entering natural fissures or cracks. The gels fill the fissures and cracks preventing the loss of fluids into these areas.

The following non-limiting examples further illustrate the gels of the present invention.

EXAMPLES

Procedure I

Preparation of Aluminum-tri-salt With Free Fatty Acid

Each of the following examples found in Table I, and Examples 14a and b in Table II, were prepared according to the same procedure unless otherwise specified.

A flask of 325.5 g (54%) of 2-ethylhexanoic acid was fitted with a power stirrer, a condenser and a nitrogen inlet. Aluminum isopropoxide, 153 g (26%) was added in parts over a 1 hour period. The resulting viscous mixture was stirred under nitrogen at 95° C. for approximately 2 hours. The fatty acid, i.e. palmitic acid (Hystrene® 9016), 57.6 g (10%) was added and the stirring was continued for 1 hour at 95° C. Toluene, 10%, was added to the final product. The product was bottled and tested for gelling.

The fatty acid found in the third column of the table, i.e. palmitic acid, was added to the samples to improve flow characteristics and is not to be confused with the dimer-trimer fatty acid activator.

In order to test for gelling, the prepared gelling agents found in the tables below, 2.5–3%, were then added to 100 mL of diesel and blended for 30 seconds. Dimer-trimer fatty acid (DTA-350 supplied by Witco, 0.05% to 0.1%), was then added to the mixture and followed by 0.1% water. The sample was then stirred at 2000 rpm until by visual observation, a viscoelastic gel had formed. The time required for gel formation was measured from the time the activator is delivered to the oil-base fluid to a complete vortex closure of the fluid in the blender at about 3000 to 4000 rpm. Generally, products with DTA-350 formed a gel within about 1.5 to 3 minutes, depending on the diesel utilized. A complete vortex closure, or formation of a lip, occurred within about 3 minutes. If the gel was stinging, a lip could be obtained by transferring the gel from cup to cup. A Model 50 Rheometer (fann 50) was then utilized to evaluate the performance, i.e. strength, of the formed gel.

TABLE I

Examples 1–12

| Example | Carboxylic Acid | Fatty Acid | Metal | Solvent | Gel Time | Thermal Stability |
| --- | --- | --- | --- | --- | --- | --- |
| 1 | 2-EHA | palmitic | AIP | toluene | <3 min. | ~107° C. |
| 2 | 2-EHA | lauric | AIP | toluene | <3 min. | — |
| 3 | 2-EHA | stearic | AIP | toluene | <5 min. | ~93° C. |
| 4 | 2-EHA | naphthenic | AIP | toluene | ~5 min. | — |
| 5 | 2-EHA | palmitic | AIP | A150 | <5 min. | ~93° C. |
| 6 | 2-EHA | — | Al Acetate | solid | <5 min. | — |
| 7 | 2-EHA | palmitic | AIP | toluene/IPA | <3 min. | ~107° C. |
| 8 | 2-EHA | palmitic | AIP | A150/IPA | <5 min. | ~93° C. |
| 9 | 2-EHA | palmitic | AIP | toluene/ether | <5 min. | ~93° C. |
| 10 | $C_{16}$ | — | AIP | toluene | <3 min. | ~135° C. |

TABLE I-continued

Examples 1–12

| Example | Carboxylic Acid | Fatty Acid | Metal | Solvent | Gel Time | Thermal Stability |
|---|---|---|---|---|---|---|
| 11 | $C_{12}$ | — | AIP | toluene | <3 min. | ~121° C. |
| 12 | $C_{12}$ | palmitic | AIP | toluene or A150 | <3 min. | ~121° C. |
| 13* | octanoic acid | stearic | AIP | toluene or A150 | <3 min. | ~121° C. |

2-EHA = 2-ethylhexanoic acid
AIP = aluminum isopropoxide
IPA = isopropyl alcohol
A150 = Aromatic 150 solvent available from Exxon Chemical or from Shell Chemical

*Example 14 also had a small amount of aluminum-2-ethylhexanoic acid di-salt.

The gelling agents in the following table were prepared in a similar manner by one of the following three procedures with the exception of 14a and 14b which were prepared according to procedure I, above.

Procedure II

Preparation of Gelling Agent Without Free Acid (full salt)

Examples 16a and b

To a flask containing 2-ethylhexanoic acid, 260 g, was added aluminum isopropoxide, 136 g, in parts over a 1 hour period. The resulting viscous mixture was refluxed under nitrogen at 95° C. for 2 hours. Fatty acid, i.e. Hystrene® 9016 palmitic acid, 48 g, was added and the stirring was continued for 1 hour. Toluene, 60 g, was added to the final product. The product was bottled and tested for gelling. Examples 15a and b and 19a and b were prepared using this procedure.

The amount of aluminum isopropoxide in this procedure has been increased to form a tri-salt of both the 2-ethylhexanoic acid (aluminum- tri-2-ethylhexanoate) and the tri-fatty acid (aluminum-tri-palmitate or aluminum-tri-stearate depending on which acid is utilized).

Procedure III

Preparation of Aluminum Salt of Linear Fatty Acid and Blends Thereoff

Examples 16a and b and 17a and b

Linear aluminum octonoate was prepared in a manner similar to the preparation of the tri-salt. To a flask of 216 g of octanoic acid, 108 g of isopropoxide was added in parts over a period of 1 hour. The resulting viscous mixture was refluxed for 2 hours under nitrogen at 95° C. A straw colored viscous liquid was obtained. In a round bottomed flask, Salt 1 in the table below, i.e. aluminum-tri-octanoate (linear), was mixed with, i.e., hydroxyaluminum bis(2-ethylhexanoate), 63.8 g, and the slurry was mixed thoroughly for about 30 minutes. To this mixture, aluminum tri-stearate, 16.8 g, was added followed by 12 g of isopropanol (IPA) and 30 g of toluene. The blend was then tested for gelling as described before Table I, above.

Procedure IV

Examples 19a and b

To 2-ethylhexanoic acid, 108.15 g, aluminum isopropoxide, 76.6 g, was added over a 1½ hour period. The resulting viscous mixture was refluxed under nitrogen at 95 C. for 2 hours. Rapeseed oil (fatty acid), 102 g, was added and the stirring was continued for 1–2 hours at 90 C. The molar ratio of 2-ethylhexanoic acid to rapeseed oil is about 2:1. The resultant aluminum salt which is formed appears to be a tri-salt having two molecules of 2-ethylhexanoate and one molecule of the rapeseed oil. Toluene, 15 g, was added to the final product. The product, a brown liquid, was bottled and tested for gelling.

TABLE II

| Example | Ingredient 1 Al tri-salt | Ingredient 2 acid or salt | Ingred 3 di-salt | DTA 350 | Solvent | Gel Time |
|---|---|---|---|---|---|---|
| 14a | 2-EHA | Palmitic acid | — | yes | toluene | 1 min |
| 14b | 2-EHA | Palmitic acid | — | no | toluene | >6 min. |
| 15a | 2-EHA | Al-tri-P | — | yes | toluene | 1 ¼ min. |
| 15b | 2-EHA | Al-tri-P | — | no | toluene | >6 min. |
| 16a | Octanoic | Al-tri-S | Al-di-2-EHA | yes | — | 6–8 sec |
| 16b[1] | Octanoic | Al-tri-S | Al-di-2-EHA | no | — | ~5 min. |
| 17a | Octanoic | Al-tri-P | Al-di-2-EHA | yes | — | 30 sec |
| 17b[1] | Octanoic | Al-tri-P | Al-di-2-EHA | no | — | ~5 min. |
| 18a | HDA | palmitic acid | — | yes | — | 3 min. |
| 18b | HDA | palmitic acid | — | no | — | 12 min. |
| 19a[2] | 2-EHA | rapeseed oil | — | yes | — | 1 min. |
| 19b[2] | 2-EHA | rapeseed oil | — | no | — | 6 min. |

2-EHA = 2-ethylhexanoic acid
HDA = 2-hexyldodecanoic acid
Al-di-2-EHA = monoaluminum di-2-ethylhexanoate hydroxy salt rather than an acid
Al-tri-S = aluminum tri-stearate
Al-tri-P = aluminum tri-palmitate TABLE II-continued

| Example | Ingredient 1 Al tri-salt | Ingredient 2 acid or salt | Ingred 3 di-salt | DTA 350 | Solvent | Gel Time |
|---|---|---|---|---|---|---|

DTA 350 is a dimer-trimer acid supplied by Witco Corp.
[1]While 16b and 17b formed gels in about 5 minutes, they were very weak and tended to break easily. This would make it difficult for the gel to carry proppant particles to the fracture site because as the gel breaks, the viscosity decreases, allowing the particles to fall out.
[2]This salt is a tri-salt which is an aluminum metal complexed to two molecules of ethylhexanoic acid, and one molecule from rapseed oil. Rapseed oil is an mixture of long chain fatty acids with 18 to 22(erucic acid) carbon atoms, with erucic acid being a major component.

Table II illustrates the difference in gel time between those compositions of the present invention which have dimer-trimer acid (activator) added in amounts of about 0.1%, and those compositions which do not. As can be seen from the table, the compositions without the dimer-trimer acid form gels more slowly.

The addition of a monomeric fatty acid is not necessary to the hydrocarbon gels of the present invention, although some of the preferred embodiments include monomeric fatty acids.

What is claimed is:

1. A gelled hydrocarbon fluid useful as a fracturing fluid in subterranean formations, comprising:
    a) at least one salt of a carboxylic acid having from about 6 to about 30 carbon atoms; and
    b) at least one activator which is selected from the group consisting of difunctional and trifunctional carboxylic acids having about 16 or more carbon atoms, and mixtures thereof.
2. The gelled hydrocarbon fluid of claim 1 wherein said salt is branched.
3. The gelled hydrocarbon fluid of claim 1 further comprising from about 0.1% to about 5% water.
4. The gelled hydrocarbon fluid of claim 1 comprising from about 1% to about 20% by weight of said carboxylic acid salt.
5. The gelled hydrocarbon fluid of claim 1 comprising from about 0.05% to about 20% by weight of said activator.
6. The gelled hydrocarbon fluid of claim 1 wherein said carboxylic acid salt has from about 8 to about 20 carbon atoms.
7. The gelled hydrocarbon fluid of claim 1 wherein said carboxylic acid is 2-ethylhexanoic acid.
8. The gelled hydrocarbon fluid of claim 1 wherein said salt is a tri-salt.
9. The gelled hydrocarbon fluid of claim 1 wherein said salt is a salt of a metal selected from the group consisting of aluminum, boron, zinc, copper, iron, magnesium, calcium, barium, titanium, zirconium, cobalt, and mixtures thereof.
10. The gelled hydrocarbon fluid of claim 1 wherein said salt is an aluminum salt.
11. The gelled hydrocarbon fluid of claim 1 wherein said carboxylic acid salt is aluminum-2-ethylhexanoate.
12. The gelled hydrocarbon fluid of claim 1 wherein said activator is a dimer-trimer acid having from about 16 to about 40 carbon atoms.
13. The gelled hydrocarbon fluid of claim 1 wherein said gel forms in less than about 5 minutes.
14. The gelled hydrocarbon fluid of claim 1 wherein said gel forms in from about 1.5 to about 3 minutes.
15. A method of fracturing a subterranean formation comprising the steps of:
    I. providing a gelled hydrocarbon based fracturing fluid said fluid comprising:
        a) a fluid hydrocarbon medium;
        b) at least one carboxylic acid salt added to said medium; and
        c) at least one activator selected from the group consisting of difunctional and trifunctional carboxylic acids, and mixtures thereof added to said medium; and
    II. pumping the hydrocarbon gel through a wellbore and into a subterranean formation at a pressure sufficient to fracture said formation.
16. The method of claim 15 wherein said gel forms in less than about 5 minutes.
17. The method of claim 15 wherein said gel forms in from about 1.5 to about 3 minutes.
18. The method of claim 15 further comprising from about 0.1% to about 5% water.
19. The method of claim 15 wherein said hydrocarbon medium is diesel.
20. The method of claim 15 wherein said carboxylic acid salt is aluminum-2-ethylhexanoate.
21. A method of making a hydrocarbon gel comprising the steps of:
    a) providing a hydrocarbon liquid;
    b) adding a carboxylic acid salt to said hydrocarbon liquid;
    c) adding an acid activator which is a difunctional, trifunctional carboxylic acid, and mixtures thereof, to said hydrocarbon liquid; and
    d) adding from 0% to about 5% water to said hydrocarbon liquid;
    wherein said hydrocarbon liquid forms a gel.
22. The method of claim 21 wherein said water is added in an amount of about 0.1% to about 5%.
23. A gelled hydrocarbon fluid useful as a fracturing fluid in subterranenan formations, comprising:
    a) at least one hydrocarbon medium; and
    b) at least one metal alkoxide dicarboxylate salt of the following general formula $$(CH_3-(CH_2)_y-COO_n X$$

wherein X is a metal alkoxide, y is 6 to 28, and n is equal to the available valency of the metal.
24. A gelled hydrocarbon fluid useful as a fracturing fluid in subterranean formations, comprising:
    a) at least one salt of a carboxylic acid having from about 6 to about 30 carbon atoms;
    b) at least one activator which is selected from the group consisting of difunctional and trifunctional carboxylic acids, and mixtures thereof; and c) about 0.1 wt. % to about 5 wt. % water based on a weight of the gelled hydrocarbon fluid.

25. A method of making a hydrocarbon gel comprising the steps:
   a) providing a hydrocarbon liquid;
   b) adding a carboxylic acid salt to said hydrocarbon liquid;
   c) adding an acid activator which is selected from the group consisting of difunctional carboxylic acids, trifunctional carboxylic acids, and mixtures thereof; and
   d) adding from 0.1% to 5% by weight water to said hydrocarbon liquid;
   wherein said hydrocarbon liquid forms a gel.

26. A gelled hydrocarbon fluid useful as a fracturing fluid in subterranean formations, comprising:
   a) at least one salt of a carboxylic acid having the following general formula $$(CH_3-(CH_2)_y-COO)_nX$$

wherein X is a multivalent metal or a metal alkoxide, y is 6 to 28, and n is equal to an available valency of the metal; and
   b) at least one activator which is selected from the group consisting of difunctional and trifunctional carboxylic acids having about 16 or more carbon atoms, and mixtures thereof.

* * * * *